(12) United States Patent
Magness

(10) Patent No.: US 9,743,540 B2
(45) Date of Patent: *Aug. 22, 2017

(54) PROTECTIVE ENCLOSURE FOR AN ELECTRONIC DEVICE

(71) Applicant: OTTER PRODUCTS, LLC, Fort Collins, CO (US)

(72) Inventor: Cameron D. Magness, Fort Collins, CO (US)

(73) Assignee: Otter Products, LLC, Fort Collins, CO (US)

(*) Notice: Subject to any disclaimer, the term of this patent is extended or adjusted under 35 U.S.C. 154(b) by 171 days.

This patent is subject to a terminal disclaimer.

(21) Appl. No.: 14/807,498

(22) Filed: Jul. 23, 2015

(65) Prior Publication Data

US 2015/0327643 A1 Nov. 19, 2015

Related U.S. Application Data

(63) Continuation of application No. 13/689,714, filed on Nov. 29, 2012, now Pat. No. 9,125,297.

(60) Provisional application No. 61/684,127, filed on Aug. 16, 2012.

(51) Int. Cl.
| | |
|---|---|
| *A45F 5/00* | (2006.01) |
| *H05K 5/02* | (2006.01) |
| *G06F 1/16* | (2006.01) |
| *A45C 11/00* | (2006.01) |

(52) U.S. Cl.
CPC ............... *H05K 5/02* (2013.01); *A45C 11/00* (2013.01); *A45F 5/00* (2013.01); *G06F 1/1626* (2013.01); *G06F 1/1656* (2013.01); *A45C 2011/002* (2013.01); *A45C 2011/003* (2013.01); *G06F 2200/1633* (2013.01)

(58) Field of Classification Search
CPC .............. A45C 11/00; A45C 2011/003; A45C 2011/002; A45C 2011/001; A45F 5/00; H05K 5/02; G06F 1/1626; G06F 1/1656; G06F 2200/1633; G06F 1/163; H04B 1/3833; H04B 1/3888; H04M 1/0247
USPC ......................................................... 224/191
See application file for complete search history.

(56) References Cited

U.S. PATENT DOCUMENTS

| | | |
|---|---|---|
| 3,023,885 A | 3/1962 | Kindseth |
| 4,029,999 A | 6/1977 | Neumann et al. |
| 4,097,878 A | 6/1978 | Cramer |
| 4,584,718 A | 4/1986 | Fuller |

(Continued)

FOREIGN PATENT DOCUMENTS

| | | |
|---|---|---|
| WO | 9400037 A1 | 1/1994 |
| WO | 9941958 A1 | 8/1999 |
| WO | 2015103599 A1 | 7/2015 |

*Primary Examiner* — Anthony Stashick
*Assistant Examiner* — James M Van Buskirk

(57) ABSTRACT

A protective enclosure for an electronic device can include a structural layer having a plurality of openings. The structural layer can be made of a first material and provide rigidity to the protective enclosure. The protective enclosure can include an outer cushion portion made of a second material and disposed over an outer surface of the structural layer. The outer cushion portion can provide cushioning to the protective enclosure. The protective enclosure can include an inner cushion portion connected to the outer cushion portion and can be configured to protrude through the openings of the structural layer and extend beyond the structural layer, supporting the electronic device installed in the protective enclosure.

20 Claims, 9 Drawing Sheets

(56) References Cited

U.S. PATENT DOCUMENTS

| | | | |
|---|---|---|---|
| 5,025,921 A | 6/1991 | Gasparaitis et al. |
| 5,123,044 A | 6/1992 | Tate |
| 5,138,523 A | 8/1992 | Benck et al. |
| 5,360,108 A | 11/1994 | Alagia |
| 5,368,159 A | 11/1994 | Doria |
| 5,380,968 A | 1/1995 | Morse |
| 5,383,091 A | 1/1995 | Snell |
| 5,386,084 A | 1/1995 | Risko |
| 5,388,691 A | 2/1995 | White |
| 5,388,692 A | 2/1995 | Withrow et al. |
| D365,927 S | 1/1996 | Cho |
| 5,508,479 A | 4/1996 | Schooley |
| 5,671,120 A | 9/1997 | Kikinisi |
| 6,317,313 B1 | 11/2001 | Mosgrove et al. |
| 6,349,824 B1 | 2/2002 | Yamada |
| 6,375,009 B1 | 4/2002 | Lee |
| 6,445,577 B1 | 9/2002 | Madsen et al. |
| 6,456,487 B1 | 9/2002 | Hetterick |
| 6,616,111 B1 | 9/2003 | White |
| 6,625,394 B2 | 9/2003 | Smith et al. |
| 6,626,362 B1 | 9/2003 | Steiner et al. |
| 6,701,159 B1 | 3/2004 | Powell |
| 6,762,935 B2 | 7/2004 | Hidewasa |
| 7,050,841 B1 | 5/2006 | Onda |
| D526,780 S | 8/2006 | Richardson et al. |
| 7,194,291 B2 | 3/2007 | Peng |
| D542,524 S | 5/2007 | Richardson et al. |
| 7,236,588 B2 | 6/2007 | Gartrell |
| 7,343,184 B2 | 3/2008 | Rostami |
| 7,359,184 B2 | 4/2008 | Lord |
| D574,819 S | 8/2008 | Andre et al. |
| D581,155 S | 11/2008 | Richardson et al. |
| D581,421 S | 11/2008 | Richardson et al. |
| D587,008 S | 2/2009 | Richardson et al. |
| D589,016 S | 3/2009 | Richardson et al. |
| 7,555,325 B2 | 6/2009 | Goros |
| 7,558,594 B2 | 7/2009 | Wilson |
| 7,933,122 B2 | 4/2011 | Richardson et al. |
| 8,442,604 B1 | 5/2013 | Diebel |
| 8,453,344 B2 | 6/2013 | Nishiwaki et al. |
| 8,457,701 B2 | 6/2013 | Diebel |
| 8,755,852 B2 | 6/2014 | Hynecek et al. |
| 9,008,738 B1 | 4/2015 | Dong |
| 9,060,580 B2 | 6/2015 | Tages |
| 9,098,238 B2 | 8/2015 | Richardson et al. |
| 9,125,297 B2 | 9/2015 | Magness |
| 2002/0065054 A1 | 5/2002 | Humphreys et al. |
| 2002/0079244 A1 | 6/2002 | Kwong |
| 2005/0088811 A1 | 4/2005 | Ulla et al. |
| 2005/0224508 A1 | 10/2005 | Tajiri et al. |
| 2005/0279661 A1 | 12/2005 | Hodges |
| 2006/0255493 A1 | 11/2006 | Fouladpour |
| 2007/0071423 A1 | 3/2007 | Fantone et al. |
| 2007/0115387 A1 | 5/2007 | Ho |
| 2007/0158220 A1 | 7/2007 | Cleereman et al. |
| 2008/0163463 A1 | 7/2008 | Hulden |
| 2009/0283184 A1 | 11/2009 | Han |
| 2010/0006468 A1 | 1/2010 | Lin |
| 2010/0093412 A1 | 4/2010 | Serra et al. |
| 2010/0122756 A1 | 5/2010 | Longinotti-Buitoni |
| 2010/0203931 A1 | 8/2010 | Hynecek et al. |
| 2011/0064401 A1 | 3/2011 | DeSorbo |
| 2011/0192857 A1 | 8/2011 | Rothbaum et al. |
| 2011/0228459 A1 | 9/2011 | Richardson et al. |
| 2012/0018325 A1 | 1/2012 | Kim |
| 2012/0111881 A1 | 5/2012 | Gaddis, II et al. |
| 2012/0287565 A1 | 11/2012 | Bennett |
| 2013/0027862 A1 | 1/2013 | Rayner |
| 2013/0098788 A1 | 4/2013 | McCarville et al. |
| 2013/0175186 A1 | 7/2013 | Simmer |
| 2013/0220841 A1 | 8/2013 | Yang |
| 2014/0049142 A1 | 2/2014 | Magness |
| 2014/0097102 A1 | 4/2014 | Piatt et al. |
| 2014/0183065 A1 | 7/2014 | Toulotte |
| 2014/0265765 A1 | 9/2014 | Khodapanah et al. |
| 2014/0302896 A1 | 10/2014 | Xu et al. |
| 2015/0068935 A1 | 3/2015 | Kay et al. |

PROTECTIVE ENCLOSURE FOR AN ELECTRONIC DEVICE

CROSS-REFERENCE TO RELATED APPLICATIONS

This application is a continuation of U.S. Ser. No. 13/689,714, filed on Nov. 29, 2012, which claims priority to U.S. Provisional Patent Application No. 61/684,127, filed on Aug. 16, 2012. The disclosures of each of the patent applications cited in this paragraph are hereby incorporated by reference in their entireties.

BACKGROUND

Various types of electronic devices are used for communication and entertainment purposes. These devices include computers, tablets, audio players, video players, smart phones, two-way radios, and GPS receivers. These devices often include touch screens, keyboards, scroll wheels, switches, or other interactive controls. Due to the sensitive nature and high cost of these electronic devices, it is desirable to protect these devices from physical damage that can result from everyday usage.

BRIEF DESCRIPTIONS OF DRAWINGS

DETAILED DESCRIPTION

Figure 1:
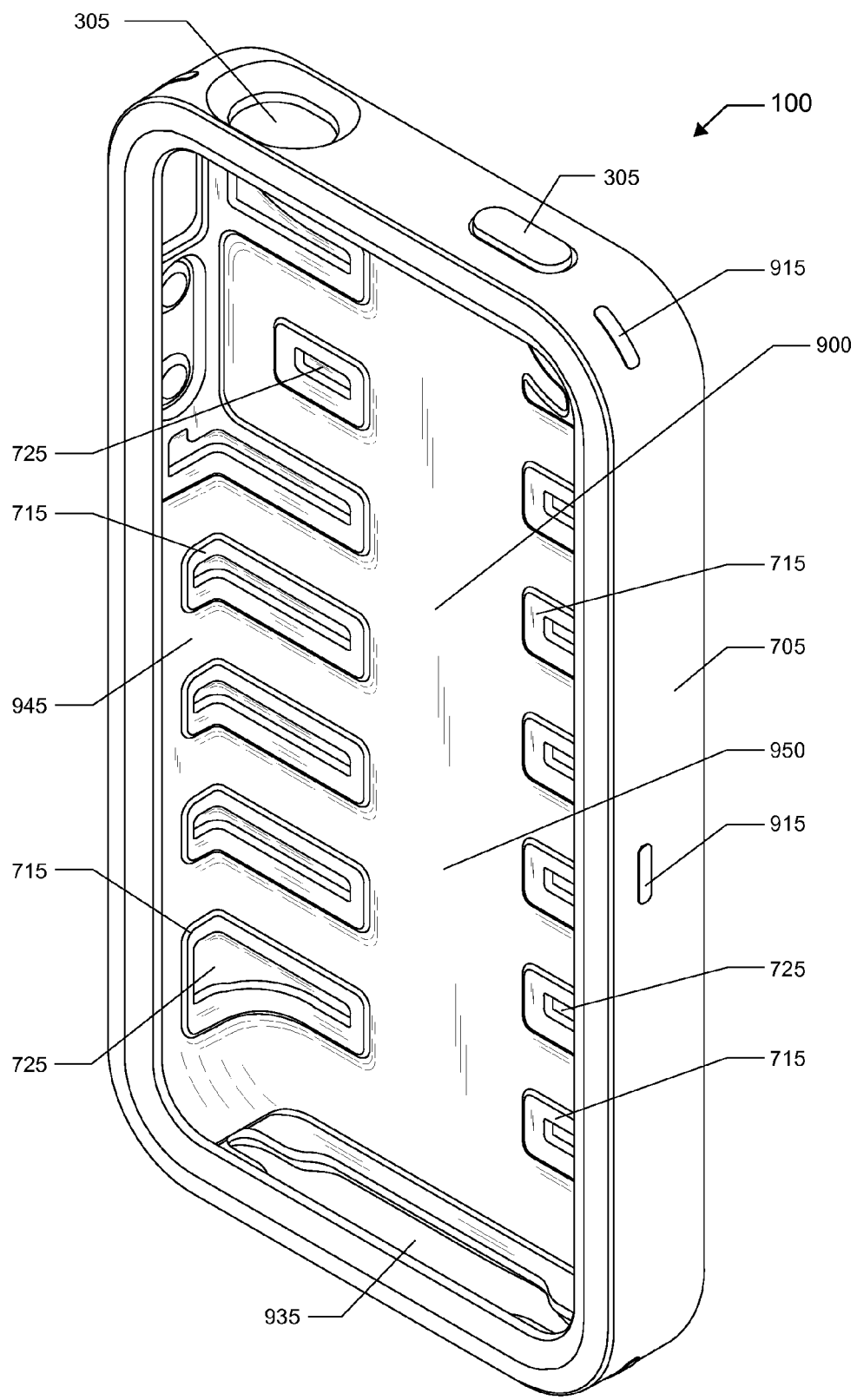
FIG. 1 is a front perspective view of a protective enclosure for an electronic device.
Figure 7:
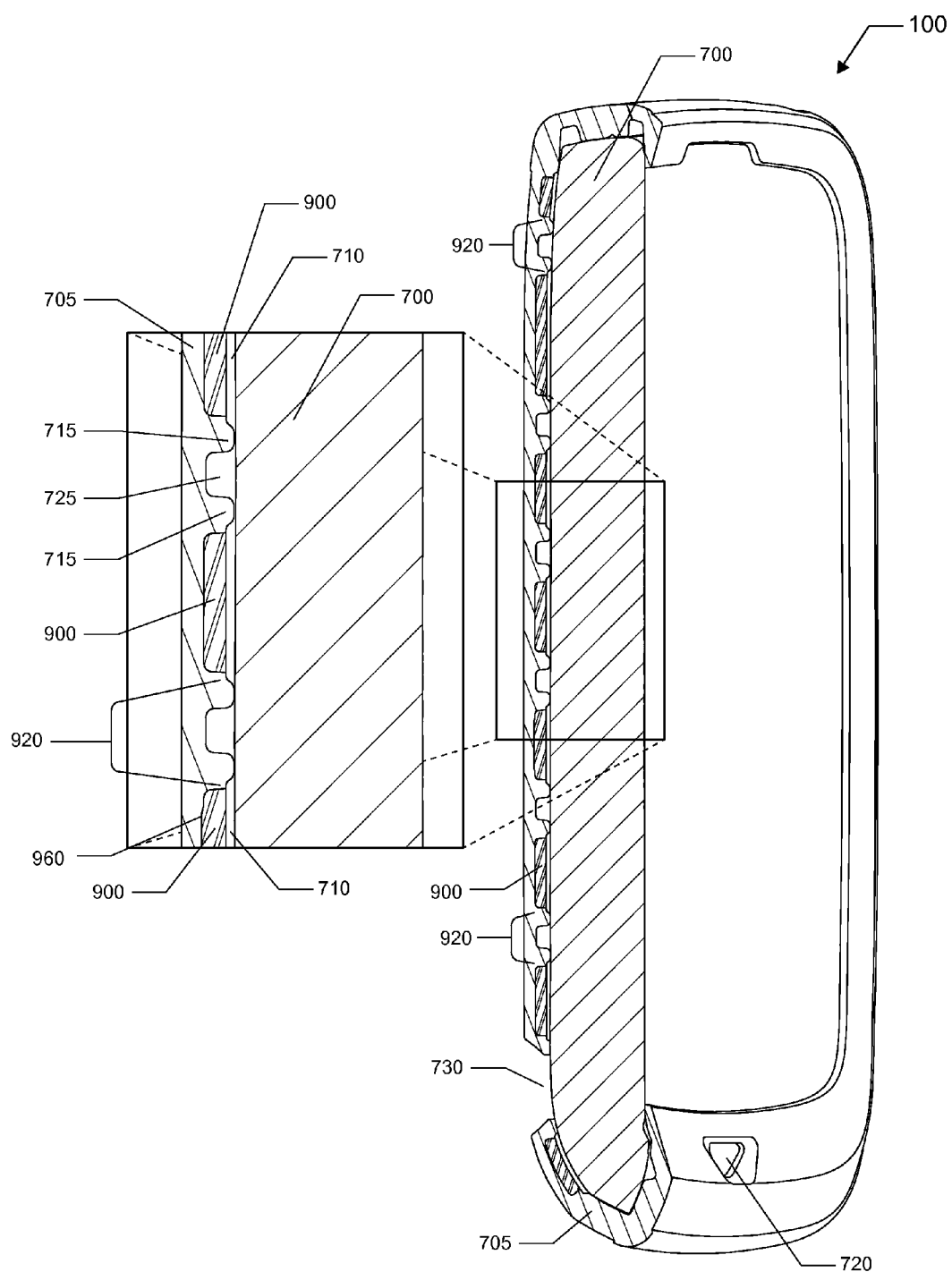
FIG. 7 is a front perspective cross-sectional view of an electronic device installed in a protective enclosure and an enlarged side cross-sectional view of the same device and protective enclosure.
Figure 9:
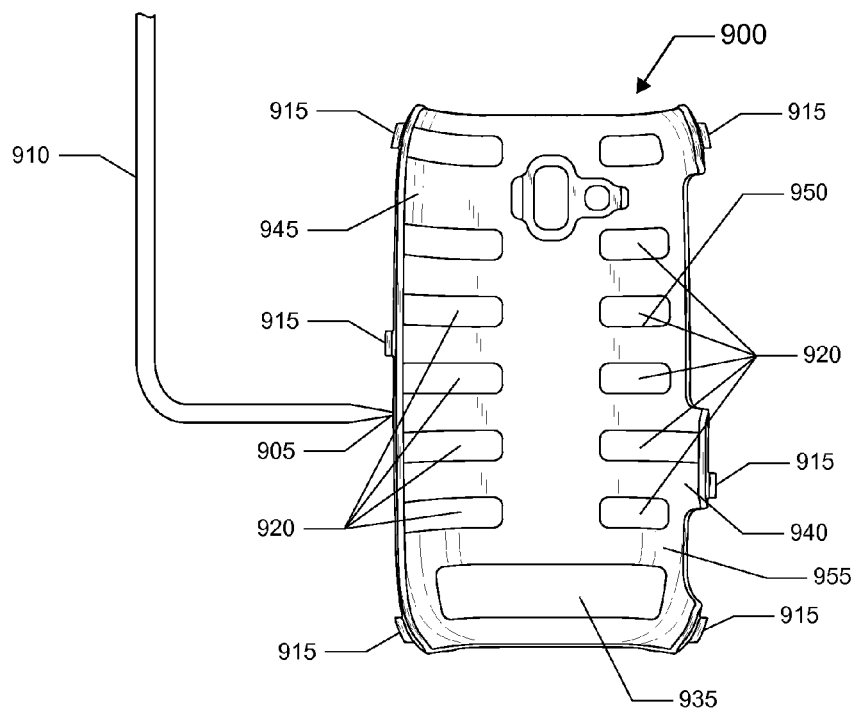
FIG. 9 is a simplified representation of an injection molding process used to form a structural layer for a protective enclosure for an electronic device.
Figure 11:
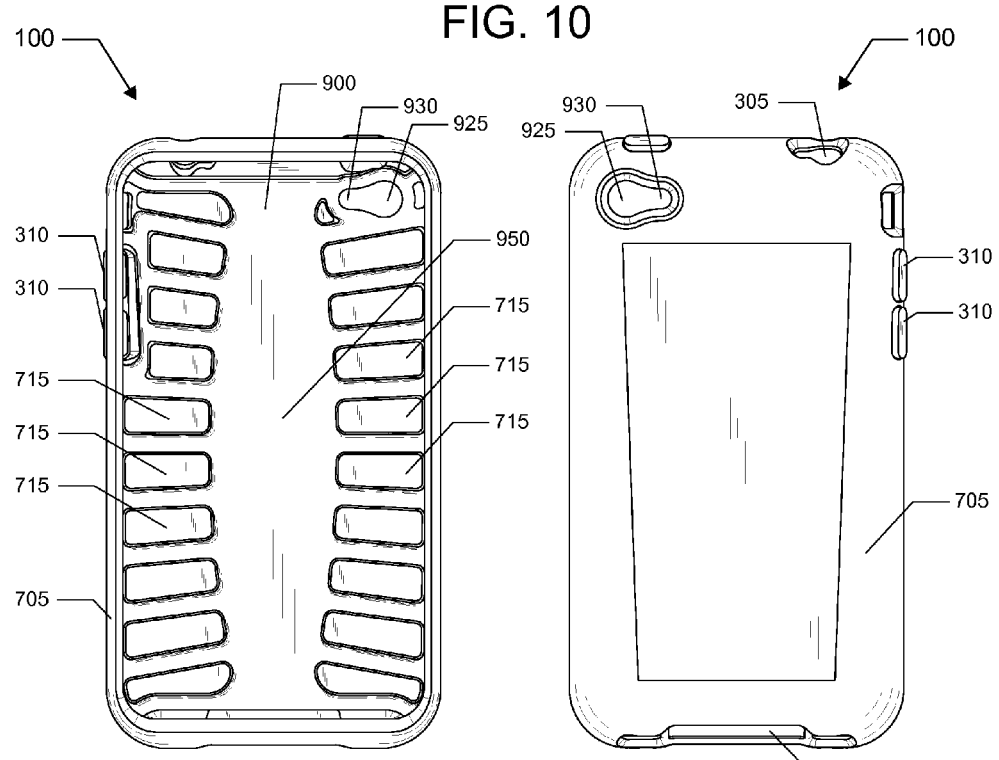
FIG. 11 is a front view of a protective enclosure for an electronic device beside a rear view of the same protective enclosure.
Figure 12:
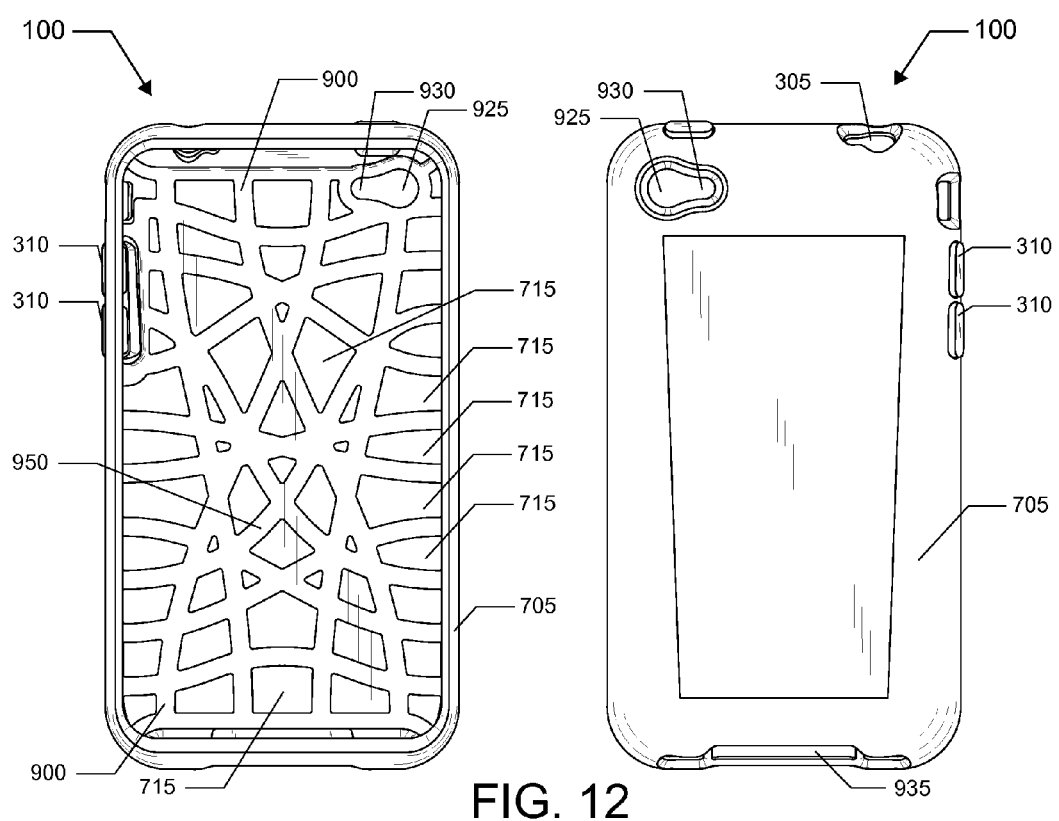
FIG. 12 is a front view of a protective enclosure for an electronic device beside a rear view of the same protective enclosure.

A protective enclosure 100 for an electronic device 700 can include a structural layer 900 surrounded on an outer surface by a flexible cushion layer 705 as shown in FIGS. 1 and 7. The structural layer 900 can include a plurality of openings 920 as shown in FIG. 9. The plurality of openings 920 can be arranged in any suitable configuration. For example, the plurality of openings 920 can be arranged vertically or horizontally as shown in FIG. 9. In another example, the plurality of openings 920 can be arranged diagonally or randomly as shown in FIGS. 11 and 12 or in any other suitable configuration. The structural layer 900 can have any suitable thickness. In one example, the thickness of the structural layer 900 can be about 0.005 to 0.1, 0.01 to 0.08, 0.01 to 0.06, 0.01 to 0.05, or 0.01 to 0.04 in. As used herein, the term "about," when referring to a value, means plus or minus 10% of the value.

Figure 2:
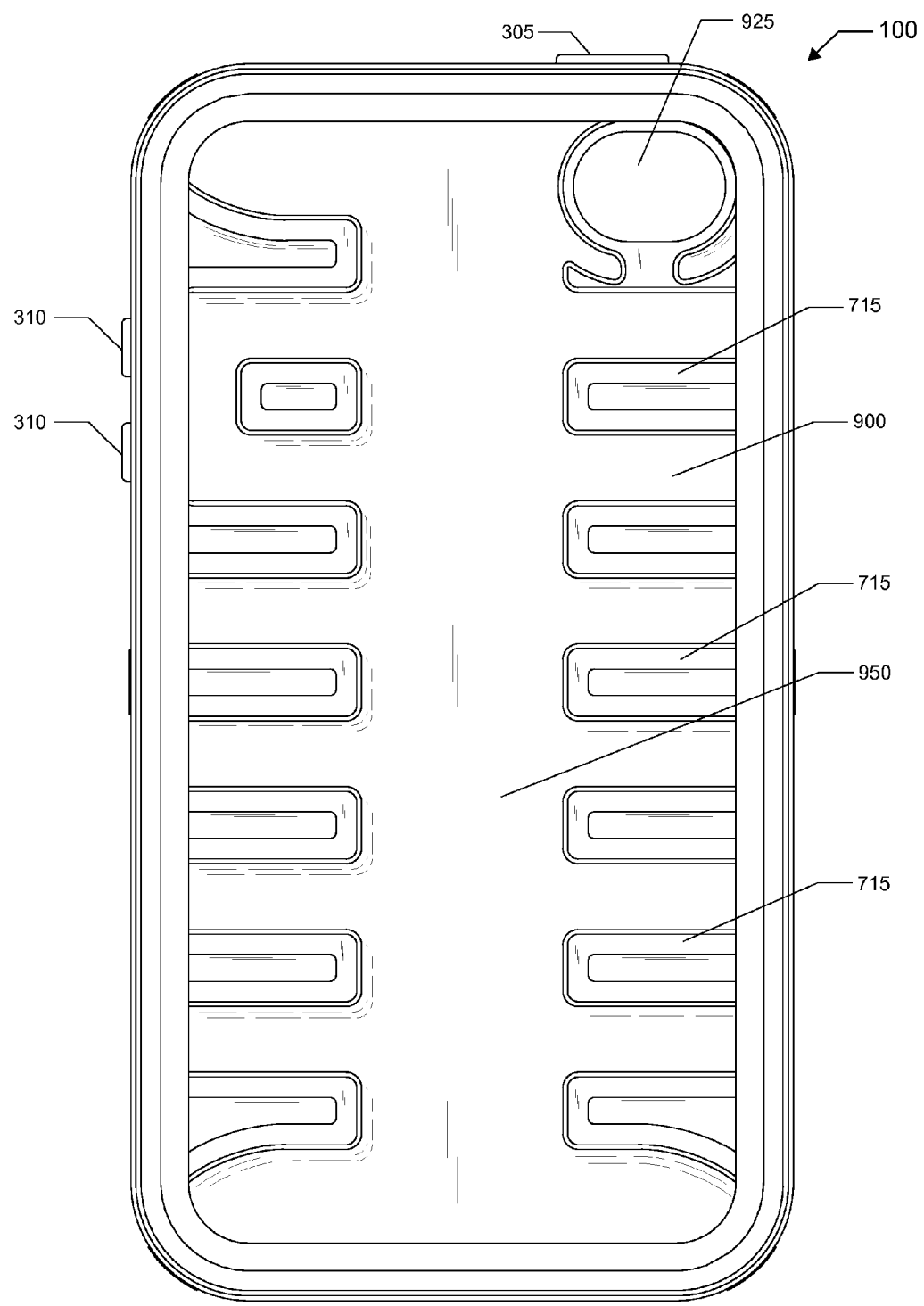
FIG. 2 is a front view of a protective enclosure for an electronic device.

The plurality of openings 920 can include any suitable number of openings. For example, the plurality of openings 920 can include at least 4 openings, 4 to 10 openings, 4 to 16 openings, or 4 to 20 openings. In another example, the plurality of openings can include about twelve openings as shown in FIG. 9, about thirteen openings as shown in FIG. 2, about nineteen openings as shown in FIG. 11, or at least fifty openings as shown in FIG. 12.

As shown in FIGS. 1, 3, 7, and 9, the structural layer 900 can include a first surface 950 proximate a rear surface 730 of an electronic device that is housed within the protective enclosure 100. The structural layer 900 can include a second surface 945 proximate a left side surface of the electronic device 700. The structural layer 900 can include a third surface 940 proximate a right side surface of the electronic device 700. As a result, the structural layer 900 can have three surfaces (940, 945, 950) proximate at least three surfaces of the electronic device 700. A first transition between the first surface 950 and second surface 945 can be an edge. Alternately, the first transition between the first surface 950 and second surface 945 can be a smooth transition, such as a curved surface. Likewise, a second transition between the first surface 950 and third surface 940 can be an edge or, alternately, a smooth transition, such as a curved surface.

The physical dimensions of the first and second transitions can be dictated by the dimensions of the electronic device 700 that the protective enclosure 100 is designed to house. For instance, certain electronic devices, such as Apple's iPhone 4/4S, may have well-defined edges that necessitate edge-like transitions between the first surface 950 and second surface 945 and between the first surface 950 and third surface 940. Conversely, other electronic devices, such as Nokia's Lumina® 610, may have smooth transitions that necessitate smooth transitions between the first surface 950 and second surface 945 and between the first surface 950 and third surface 940.

Figure 3:
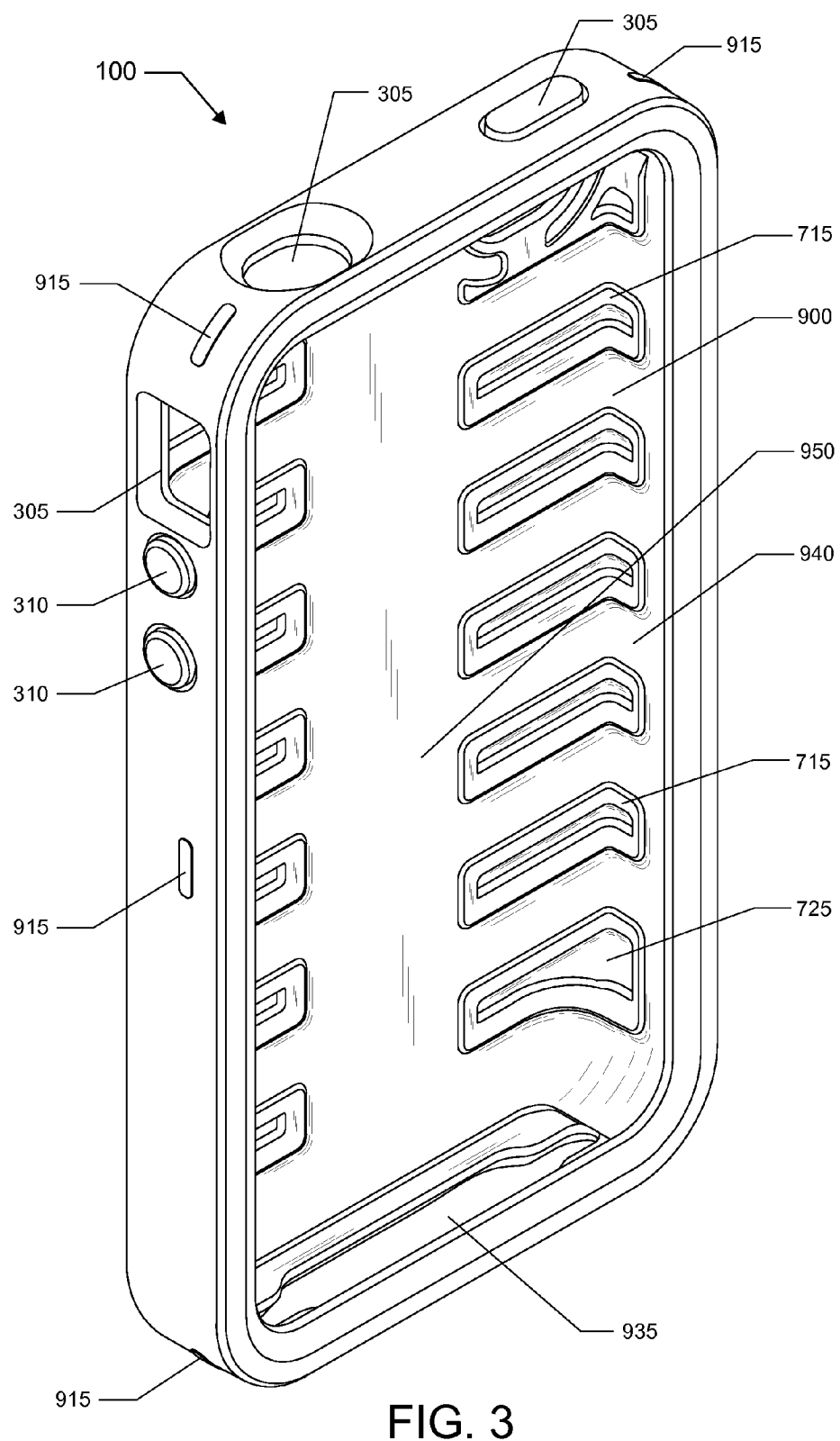
FIG. 3 is a front perspective view of a protective enclosure for an electronic device.
Figure 8:
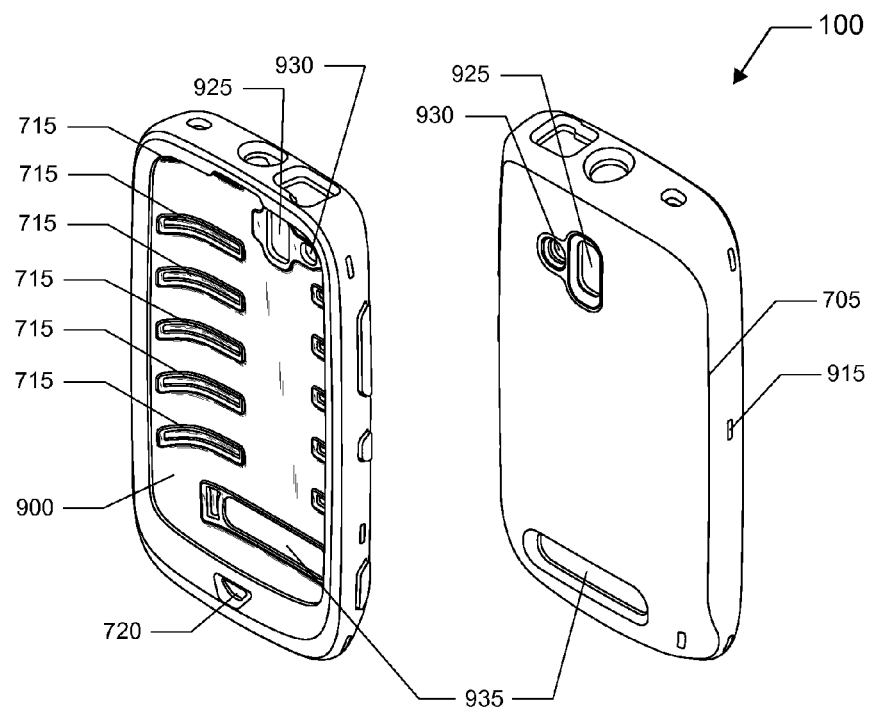
FIG. 8 is front perspective view of a protective enclosure for an electronic device beside a rear perspective view of the same protective enclosure.

As shown in FIGS. 3, 8 and 9, one or more of the plurality of openings 920 can extend from the first surface 950 through the first transition and to the second surface 945 of the structural layer 900. Likewise, one or more of the plurality of openings 920 can extend from the first surface 950 through the second transition to the third surface 940 of the structural layer 900.

The flexible cushion layer 705 can include a plurality of protrusions 715 extending through the plurality of openings 920 in the structural layer 900, as shown in FIGS. 1-3, 5, 7, 8, 11 and 12. The plurality of protrusions 715 can extend inward from the flexible cushion layer 705 through the plurality of openings 920 and toward an interior of the protective enclosure 100, as shown in FIG. 7. The plurality of protrusions 715 can be configured to make contact with outer surfaces of the electronic device 700 when installed within the protective enclosure 100. In one embodiment, the plurality of protrusions 715 can extend beyond an inner surface 955 of the structural layer 900 by a distance of about 0.005 to 0.1, 0.005 to 0.08, 0.01 to 0.05, 0.01 to 0.03, or at least 0.005 in. In another embodiment, the plurality of protrusions 715 can extend beyond an inner surface 955 of the structural layer 900 by a distance of about 0.02 in.

By having the plurality of protrusions 715 extend beyond the inner surface 955 of the structural layer 900, the plurality of protrusions 715 can provide a cushioned surface for the electronic device to rest against, thereby providing shock resistance and also preventing the outer surfaces of the electronic device 700 from contacting or rubbing against the structural layer. Compared to the flexible cushion layer 705, the structural layer 900 can be a relatively hard material that could cause unwanted wear, such as marring or scratching, on outer surfaces of the electronic device. Therefore providing separation between the structural cushion layer and the electronic device with the plurality of protrusions 715 is desirable.

Figure 5:
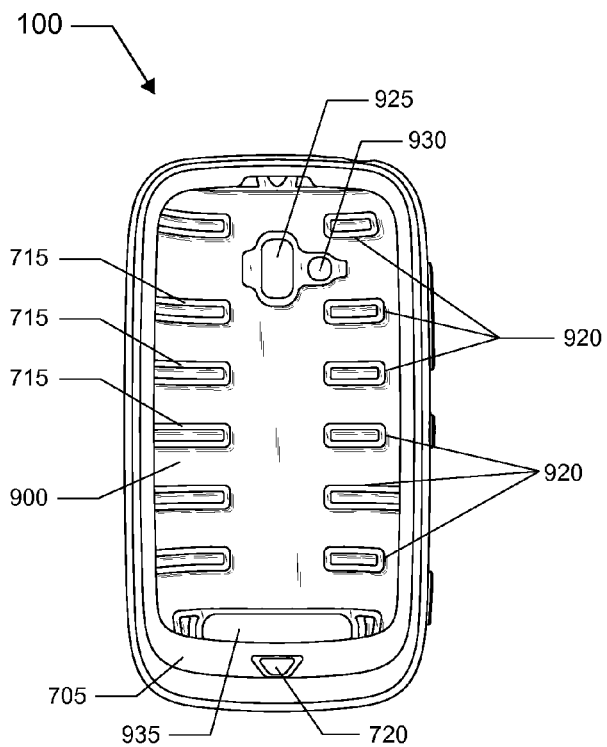
FIG. 5 is a front view of a protective enclosure for an electronic device.
Figure 6:
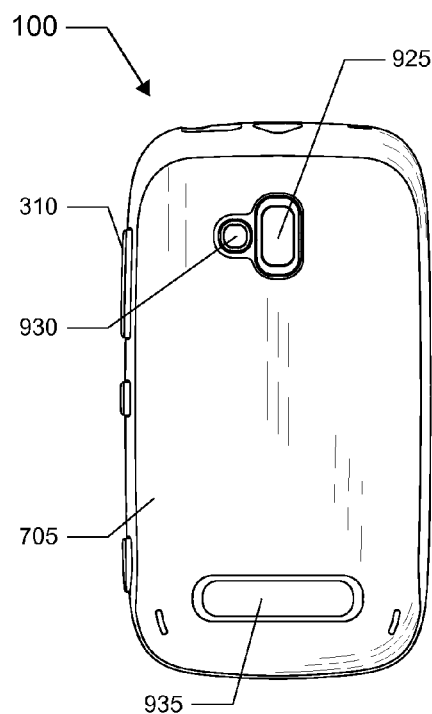
FIG. 6 is a rear view of a protective enclosure for an electronic device.

The plurality of protrusions 715 can include any suitable number of protrusions. For example, the plurality of protrusions 715 can include at least 4 protrusions, 4 to 10 protrusions, 4 to 16 protrusions, or 4 to 20 protrusions. In another example, the plurality of protrusions 715 can include about twelve protrusions as shown in FIG. 5, about thirteen protrusions as shown in FIG. 2, about nineteen protrusions as shown in FIG. 11, or at least fifty protrusions as shown in FIG. 12.

The plurality of protrusions 715 can be any suitable shape. For example, the protrusions can be rectangular as shown in FIGS. 1-3, 5, 8, and 11, trapezoidal, circular, oval, triangular, square, or polygonal as shown in FIG. 12. The plurality of protrusions can be uniform or non-uniform in shape. The plurality of protrusions 715 can be any suitable size. For example, a protrusion can have a width of about 0.125 to 1.0, 0.25 to 0.75, 0.25 to 0.5, or at least 0.125, where width is measured in a direction parallel with a side surface of the protective enclosure and perpendicular to an end surface of the protective enclosure. For certain electronic devices, such as tablets that may require larger protective enclosures, the width of the protrusion can be larger than the examples provided. Conversely, for certain electronic devices, such as portable digital music players that may require smaller protective enclosures, the width of the protrusion can be smaller than the examples provided. In one example, a protrusion can have a length of about 0.5 to 4.0, 0.75 to 2.0, 1.0 to 1.5, or at least 0.5 in, where length is measured in a direction parallel with an end surface of the protective enclosure and perpendicular to a side surface of the protective enclosure. For certain electronic devices, such as tablets or smartphones that may require larger protective enclosures, the length of the protrusion can be larger than the examples provided. Conversely, for certain electronic devices, such as portable digital music players that may require smaller protective enclosures, the length of the protrusion can be smaller than the examples provided.

One or more of the plurality of openings 920 can extend from the first surface 950 to the second surface 945 of the structural layer 900. Likewise, one or more of the plurality of openings 920 can extend from the first surface 950 to the third surface 940 of the structural layer 900. The plurality of protrusions 715 can occupy the plurality of openings 920, so they too can extend from the first surface 950 to the second surface 945 of the structural layer 900 or from the first surface 950 to the third surface 940 of the structural layer 900. In this way, the plurality of protrusions 715 can support the electronic device and prevent it from contacting the first, second, or third surfaces of the structural layer 900. Since the structural layer 900 can have a greater hardness than the cushion layer 705, suspending the electronic device 700 on the plurality of protrusions 715 above the structural layer 900, and thereby preventing the electronic device from contacting the structural layer 900, can decrease the likelihood that small movements of the electronic device within the case 100 over time will result in visible wear on any outer surfaces of the electronic device 700, such as the back or side surfaces of the device. Reducing wear on outer surfaces of the electronic device can be desirable to a customer that plans to resell the device when a next generation of the device is released, since a device without visible wear may have a higher resale value.

The flexible cushion layer 705 can be made of any suitable material. For example, the flexible cushion layer 705 can include any saturated or unsaturated elastomer. Examples of suitable materials include silicon rubbers and thermoplastic elastomers (TPE), including silicone-based thermoplastics. These examples of suitable materials are not intended to be limiting. The flexible cushion layer 705 can have any suitable hardness. In one example, the flexible cushion layer 705 can have a hardness of 30 to 70, 30 to 50, or 40 to 50 Shore A. In one embodiment, a thermoplastic elastomer can be injection molded to form the flexible cushion layer 705. The flexible cushion layer 705 can have a thickness of about 0.005 to 0.25, 0.005 to 0.1, 0.01 to 0.08, 0.01 to 0.06, 0.01 to 0.05, or 0.01 to 0.04 in.

The flexible cushion layer 705 can be any color, or it can be transparent or translucent to permit the structural layer 900 to be visible within the protective enclosure 100. By having a transparent or translucent flexible cushion layer 705, the electronic device can be visible through the plurality of openings 920 in the structural layer 900 when the device is installed in the protective enclosure. Aspects of the electronic device, such as color, trademarks, or text, may be visible through the plurality of openings 920 in the structural layer 900. In one example, an opening in the structural layer 900 can be positioned to permit a logo on the phone (e.g. such as the logo on the back surface of the iPhone®) to be visible through the flexible cushion layer 705 from a back side of the protective case. In another example, the structural layer 900 and the flexible cushion layer 705 may include openings that are aligned to permit a logo on the phone to be visible from a back side of the protective case.

If the electronic device 700 includes a solar panel along its back surface 730, having a transparent or translucent flexible cushion layer can permit sunlight to reach the solar panel while also protecting the solar panel from damage. In this example, it can be advantageous to manufacture the structural layer from a transparent or translucent material to increase the amount of solar energy that reaches the solar panel on the electronic device 700. Decreasing the thickness of the layers (705, 900) can also be advantageous for increasing the amount of solar energy that reaches the solar panel on the electronic device 700 but must be balanced against maintaining sufficient material thicknesses to retain suitable levels of protection against physical damage resulting from dropping the device onto a hard surface.

The plurality of protrusions 715 can be configured to suspend the electronic device 700 away from the surfaces (e.g. 940, 945, 950) of the structural layer 900 so that an air gap 710 exists between the structural layer 900 and the electronic device 700, as shown in FIGS. 1, 3 and 7. If the electronic device 700 is dropped onto a hard surface while housed in the protective enclosure 100, the plurality of protrusions 715 can prevent the device 700 from contacting the structural layer 900 during impact. For example, during an impact event, the plurality of protrusions 715 can compress a certain distance without the electronic device 700 contacting the structural layer 900. This response can prevent the structural layer 900, which has a hardness greater than that of the flexible cushion layer 705, from transmitting impact forces directly to the electronic device 700. By preventing the electronic device 700 from contacting the structural layer 900 during the impact event, the impact forces transmitted to the electronic device 700 can be significantly reduced and the level of protection provided by the protective enclosure 100 can be increased.

Product specifications, such as the durometer of the flexible cushion layer 705, the number and placement of protrusions 715 within the enclosure, the height of the protrusions 715, and the volume and placement of air gaps 710, can be selected to adjust the level of impact protection depending on an intended application of the protective enclosure 100 and based on attributes, such as mass and external dimensions, of the electronic device 700 to be housed in the enclosure.

Through a unique construction, the protective enclosure 100 provides a two-part enclosure that functions like, and provides benefits similar to, a more costly and complicated three-part enclosure. In particular, the enclosure performs similar to a three-part enclosure that has a structural layer sandwiched between an outer cushion layer and an inner cushion layer. As shown in FIG. 7, the protective enclosure 100 described herein can provide a flexible cushion layer 705 over an outer surface 960 of a structural layer 900 and, by way of the plurality of openings 920 in the structural layer 900, a plurality of protrusions 715 that extend into an inner volume of the enclosure 100 and function similar to the inner cushion layer of a three-part enclosure described above. The protective enclosure 100 benefits from having an exterior constructed from the flexible cushion layer 705 and an interior constructed from the same flexible cushion layer 705 in the form of the plurality of protrusions 715. As a result, the protective enclosure 100 can present a soft and tacky surface to contact and prevent shifting of the electronic device 700 and thereby prevent scratches to the device's outer surfaces. This configuration can also provide a protective enclosure with a soft exterior that is comfortable to hold and effective at absorbing impacts and isolating the electronic device 700 from damage if the protective enclosure is dropped. Concurrently, the structural layer 900 can provide rigidity to the protective enclosure 100, thereby enhancing impact protection and feel.

The protrusions forming the plurality of protrusions 715 can each have any suitable shape. For example, the protrusions 715 can be long, short, narrow, wide, or any combination thereof. The protrusions 715 can be linear or nonlinear. The protrusions 715 can have uniform or non-uniform shapes. In one embodiment, as shown in FIGS. 5 and 7, a protrusion 715 can include a raised outer portion and a sunken inner portion 725 configured to provide an air pocket between the sunken inner portion and the electronic device 700. The raised outer portion of the protrusion 715 can be rectangular in shape or any other suitable shape. During an impact event, the raised out portions of the protrusions can compress toward the structural layer 900 due to forces resulting from the dissipation of momentum of the electronic device. As the protrusions compress, the raised outer portions may compress and expand into the air pockets of the protrusions, which can assist in dissipating impact energy.

The structural layer 900 can include a camera opening 930. The camera opening 930 can pass through the structural layer 900 and be configured to surround, but not obstruct, a camera located on a rear surface 730 of the electronic device 700. Similarly, the structural layer 900 can include a flash opening 930, which can pass through the structural layer 900 and be configured to surround, but not obstruct, a flash located on a rear surface of the electronic device 700. As shown in FIG. 5, the camera opening 925 and flash opening 930 can also pass through the flexible cushion layer 705, which can surround, but not obstruct, the camera and flash.

Figure 10:
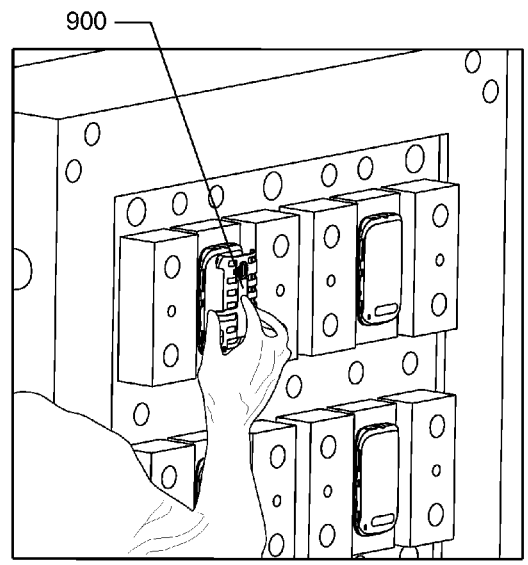
FIG. 10 is a simplified representation of a co-molding process used to form a flexible cushion layer over a structural layer of a protective enclosure for an electronic device.

The protective enclosure 100 can be formed by a co-molding process. In one example, the structural layer 900 can be formed by a first injection molding process where the structural layer is formed by injecting molding polycarbonate in a first mold. The polycarbonate can have a melting point of about 536° F., and the first mold can be maintained at a temperature of about 176° F. At the end of the process, the mold can be opened, and the completed structural layer 900 can be removed from the mold and transferred to a second injection molding process. In the second injection molding process, the structural layer 900 can be inserted into a second mold as shown in FIG. 10. The structural layer 900 can be attached to the second mold by any suitable method. In one example, the second mold can close and a TPE can be injection molded over the structural layer 900. The TPE used to create the flexible cushion layer 705 can have a melting point that is lower than the melting point of the material used to create the structural layer 900. This ensures that no melting or deformation of the structural layer 900 occurs during the formation of the flexible cushion layer 705. In one example, the TPE can have a melting point of about 430° F., and the second mold can be maintained at a temperature of about 100° F. After the flexible cushion layer 705 has been formed and the second injection molding process is complete, the second mold can then be opened, and a completed protective enclosure 100 can be removed from the second mold.

The structural layer 900 can be attached to the second mold by any suitable method. In one example, the structural layer 900 can include one or more tabs 915 extending near an outer perimeter as shown in FIG. 9. The tabs 915 can allow the structural layer 900 to attach to the second mold during the second injection molding process when forming the flexible layer 705 over the structural layer. One or more tabs 915 can be configured to be received by an opening in a second mold and thereby retain the structural layer 900 proximate the mold. In another example, the structural layer may not include any tabs, but may be capable of snapping onto the second mold due to its contoured shape, as shown in FIG. 9, which can provide an interference fit with the second mold.

Figure 4:
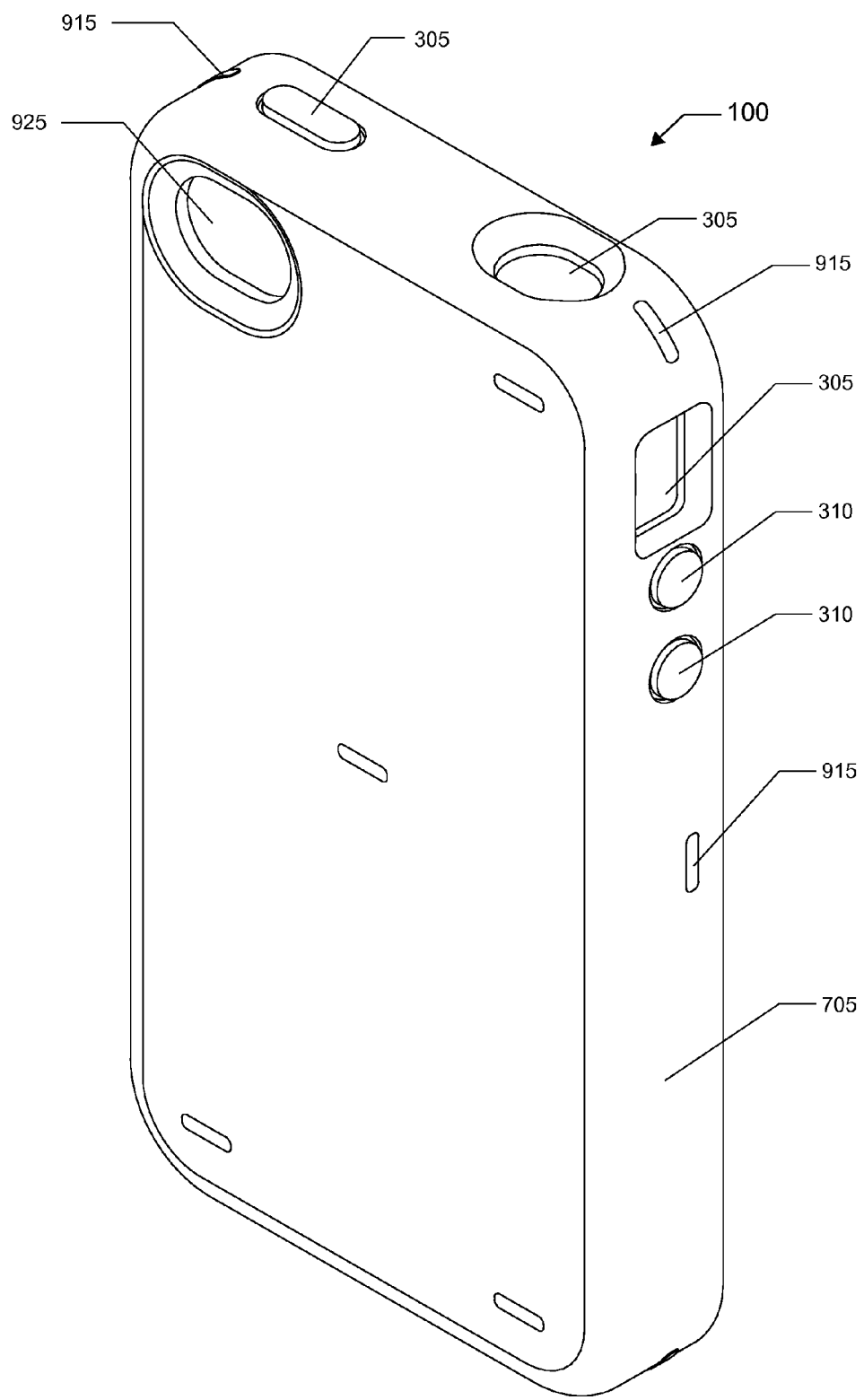
FIG. 4 is a rear perspective view of a protective enclosure for an electronic device.

In one example, the tabs 915 of the structural layer 915 can extend into the flexible cushion layer 705 and can aid in adhering the flexible cushion layer 705 to the structural layer 900. The tabs 915 may be visible along the outer surface of the protective enclosure 100, as shown in FIGS. 1, 3, and 4. Alternately, the tabs 915 may not be visible or, as discussed above, not present at all. Removing the tabs 915 can be preferable to eliminate pathways for force transmission to the electronic device resulting from an impact event. Consequently, using an interference fit to attach the structural layer to the second mold can be more preferable that using tabs to attach the structural layer to the second mold.

The structural layer 900 can include various functional openings 305. For instance, the structural layer 900 can include a connectivity opening 935 that allows data or power to be transferred to the electronic device 700 without removing the electronic device 700 from the protective enclosure 100. The connectivity opening 935 may allow a power or data cable to be connected to the electronic device. The structural layer 900 can also include openings corresponding to various buttons, ports, or features on the electronic device, including a power button, volume button, speaker opening, microphone opening 720, headphone jack, etc. In some instances, the flexible cushion layer 705 can include functional openings 305 corresponding to the functional openings of the structural layer 705 to permit a user direct access to the buttons, ports, or features of the electronic device. In other instances, the flexible cushion layer 705 can cover certain buttons, ports, or features to provide additional protection. For example, the flexible cushion layer can cover volume buttons 310 as shown in FIG. 3. In another embodiment, the flexible cushion layer can include one or more flaps to provide access to certain buttons, ports, or features of the electronic device 700.

The structural layer 900 can be formed using any suitable process, such as an injection molding process. FIG. 9 shows a simplified representation of an injection molding process where a runner 910 carries a material, such as a polymer, to a gate 905 before entering a mold cavity. The material used to form the structural layer 900 can be any suitable material such as a thermoplastic polymer or a synthetic polymer. For example, the structural layer can include polycarbonate, nylon, or glass filled nylon. Alternately, any other material, or combination of materials, that provide suitable rigidity to the protective enclosure 100 could be used.

A protective enclosure 100 for an electronic device 700 can include a structural layer 900 having a plurality of openings 920, where the structural layer provides rigidity to the protective enclosure. The protective enclosure can also include a flexible cushion layer 705 disposed over an outer surface of the structural layer, where the flexible cushion layer provides cushioning to the protective enclosure, and where the flexible cushion layer comprises a plurality of protrusions 715 extending through the plurality of openings inward toward an interior of the protective enclosure, and where the plurality of protrusions are configured to make contact with an electronic device housed within the protective enclosure. In one example, the structural layer 900 can include polycarbonate or glass filled nylon. The flexible cushion layer 705 can include, for example, silicone rubber.

In one embodiment, at least one of the plurality of protrusions 715 can include raised outer portions and sunken inner portions 725 configured to provide air pockets between the sunken inner portions and an outer surface of the electronic device. The structural layer 900 can include a first surface 950 proximate a rear surface of an electronic device housed within the protective enclosure, a second surface 945 proximate a left side surface of the electronic device, and a third surface 940 proximate a right side surface of the electronic device. In one example, at least one of the plurality of openings 920 in the structural layer can extend from the first surface 950 to the second surface 945, and at least one of the plurality of protrusions 715 can extend from the first surface to the second surface of the structural layer. In the same example, at least one of the plurality of openings 920 in the structural layer 900 can extend from the first surface 950 to the third surface 940, and at least one of the plurality of protrusions 715 can extend from the first surface to the third surface of the structural layer.

The plurality of protrusions 715 can be configured to suspend the electronic device 700 above the structural layer 900 so that an air gap 710 exists between the structural layer and the electronic device, as shown in FIG. 7. The air gap 710 can be measured as the shortest distance between the inner surface of the structural layer (e.g. 950) and the back side of the electronic device 700. The air gap 710 can range from 0.005 to 0.1, 0.005 to 0.08, 0.01 to 0.05, or 0.01 to 0.03 in. In one example, the flexible cushion layer 705 can have a thickness ranging from 0.01 to 0.055 in, and the structural layer 900 can have a thickness ranging from 0.010 to 0.055 in. The plurality of protrusions 715 can extend beyond an inner surface of the structural layer 900 by a distance of about 0.005 to 0.1, 0.005 to 0.08, 0.01 to 0.05, or 0.01 to 0.03 in. When the electronic device is installed in the protective enclosure 100, the protrusions 715 may compress slightly toward the structural layer 900. Therefore, the size of the air gap 710 after installation of the device 700 may be less than the distance beyond an inner surface of the structural layer 900 to which the plurality of protrusions 715 extend prior to installation of the device.

In one example, a method for manufacturing a protective enclosure 100 for an electronic device 700 can include forming a structural layer 900, where the structural layer can include a first material having a first melting point. The method can further include inserting the structural layer 900 into an injection molding machine and forming a flexible cushion layer 705 over the structural layer, where the flexible cushion layer can be made of a second material having a second melting point that is lower than the first melting point of the first material. The structural layer 900 can include a plurality of openings 920, and the flexible cushion layer can include a plurality of protrusions 715 extending through the plurality of openings and beyond an inner surface of the structural layer by a distance of about 0.005 to 0.1, 0.005 to 0.08, 0.01 to 0.05, or 0.01 to 0.03 in.

In one example, forming the structural layer 900 can include using a first injection molding process to produce a structural layer that has a thickness ranging from about 0.010 to 0.055 in. Inserting the structural layer 900 into a second mold can require attaching the structural layer to the second mold, which, in one example, can include engaging at least one tab from the structural layer into an opening in the second mold configured to receive the tab and to retain the structural layer proximate the second mold. In another example, attaching the structural layer 900 to the second mold can include snapping the structural layer onto the second mold, where snapping the structural layer onto the mold relies on an interference fit between structural layer and the second mold. Forming a flexible cushion layer 705 over the structural layer 900 can include using an injection molding process to produce a flexible cushion layer 705 having a thickness ranging from about 0.010 to 0.055 in.

The foregoing disclosure has been presented for purposes of illustration and description. Other modifications and variations may be possible in view of the above teachings. The embodiments described in the foregoing disclosure were chosen to explain the principles of the invention and its practical application to enable others skilled in the art to best utilize the invention. It is intended that the claims be construed to include other alternative embodiments of the invention except as limited by the prior art.

What is claimed is:

1. A protective enclosure for an electronic device, the protective enclosure comprising:
    a structural layer made of a first material, the structural layer having a first surface proximate a rear surface of the electronic device when the electronic device is installed in the protective enclosure, an outer surface, a second surface proximate a left side of the electronic device when the electronic device is installed in the protective enclosure, and a third surface proximate a right side of the electronic device when the electronic device is installed in the protective enclosure, the structural layer comprising a plurality of openings extending from the outer surface of the structural layer through the first surface of the structural layer;

an outer cushion portion made of a second material disposed over the outer surface of the structural layer to provide cushioning to the protective enclosure; and an inner cushion portion made of the second material, the inner cushion portion connected to the outer cushion portion and configured to protrude through the plurality of openings beyond the first surface of the structural layer to produce a plurality of raised protrusions extending beyond the first surface of the structural layer that support the electronic device when the electronic device is installed in the protective enclosure.

2. The protective enclosure of claim 1, wherein the plurality of raised protrusions are configured to suspend the electronic device above the first surface of the structural layer such that an air gap exists between the structural layer and the electronic device when the electronic device is installed in the protective enclosure.

3. The protective enclosure of claim 2, wherein the plurality of raised protrusions extend beyond the first surface of the structural layer by a distance of at least 0.005 in.

4. The protective enclosure of claim 1, wherein the plurality of raised protrusions comprises at least four raised protrusions.

5. The protective enclosure of claim 1, wherein at least one of the plurality of raised protrusions comprises a raised outer portion and a sunken inner portion configured to provide an air pocket between the sunken inner portion and the electronic device.

6. The protective enclosure of claim 1, wherein the structural layer comprises a tab that extends through the outer cushion portion, the tab being visible along an exterior surface of the protective enclosure.

7. A protective enclosure for an electronic device, the protective enclosure comprising:

a structural member made of a first material, the structural member having an inner surface, an outer surface, and a plurality of side members, the structural member comprising a plurality of openings extending from the outer surface of the structural member through the inner surface of the structural member, wherein the structural member provides rigidity to the protective enclosure; and a flexible cushion member made of a second material disposed over the outer surface of the structural member, the flexible cushion member comprising a plurality of protrusions configured to extend through the plurality of openings in the structural member and past the inner surface of the structural member, wherein the plurality of protrusions make contact with the electronic device when the electronic device is installed in the protective enclosure preventing the electronic device from making contact with the structural member when the electronic device is installed in the protective enclosure.

8. The protective enclosure of claim 7, wherein the structural member comprises:

a first side proximate a rear surface of the electronic device when the electronic device is housed within the protective enclosure;

a second side proximate a left side surface of the electronic device when the electronic device is housed within the protective enclosure; and a third side proximate a right side surface of the electronic device when the electronic device is housed within the protective enclosure.

9. The protective enclosure of claim 8, wherein at least one of the plurality of openings in the structural member extends from the first side to the second side of the structural member and wherein at least one of the plurality of protrusions extends from the first side to the second side of the structural member.

10. The protective enclosure of claim 7, wherein the plurality of protrusions are configured to suspend the electronic device above the inner surface of the structural member such that an air gap exists between the structural member and the electronic device when the electronic device is installed in the protective enclosure.

11. The protective enclosure of claim 10, wherein the plurality of protrusions extend beyond the inner surface of the structural member by a distance of at least 0.005 in.

12. The protective enclosure of claim 7, wherein the first material comprises polycarbonate or glass filled nylon.

13. The protective enclosure of claim 7, wherein the second material comprises a silicone rubber or thermoplastic elastomer.

14. A protective enclosure for an electronic device, the protective enclosure comprising:

a structural member comprising a plurality of openings, wherein the structural member provides rigidity to the protective enclosure; and a flexible cushion member disposed over an outer surface of the structural member, wherein the flexible cushion member provides cushioning to the protective enclosure, wherein the flexible cushion member comprises a plurality of protrusions extending through the plurality of openings of the structural member and beyond an interior surface of the structural member, wherein the plurality of protrusions are configured to make contact with an electronic device that is installed in the protective enclosure.

15. The protective enclosure of claim 14, wherein the plurality of protrusions are configured to suspend the electronic device above an inner surface of the structural member such that an air gap exists between the structural member and the electronic device when the electronic device is installed in the protective enclosure.

16. The protective enclosure of claim 15, wherein the plurality of protrusions extend beyond the inner surface of the structural member by a distance of at least 0.005 in.

17. The protective enclosure of claim 14, the structural member comprising a tab that extends through the outer cushion portion, the tab being visible along an exterior surface of the protective enclosure.

18. The protective enclosure of claim 14, wherein the plurality of protrusions comprise at least four protrusions.

19. The protective enclosure of claim 14, wherein each protrusion of the plurality of protrusions has a width of at least 0.25 in. and a length of at least 0.50 in.

20. The protective enclosure of claim 14, wherein at least one of the plurality of protrusions comprises a raised outer portion and a sunken inner portion configured to provide an air pocket between the sunken inner portion and the electronic device.

* * * * *